United States Patent
Anilson et al.

(10) Patent No.: US 8,429,127 B2
(45) Date of Patent: Apr. 23, 2013

(54) CIRCUMVENTING QUEUE DOWNTIME IN A QUEUE DAMAGE SCENARIO

(75) Inventors: Maya Anilson, Bangalore (IN); Vasu Gajendran, Bangalore (IN); Savitha Joshi, Bangalore (IN); Abhilash Divakaran Pillai, Alapuzha (IN)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 12/963,749

(22) Filed: Dec. 9, 2010

(65) Prior Publication Data

US 2012/0150916 A1    Jun. 14, 2012

(51) Int. Cl.
*G06F 7/00* (2006.01)
(52) U.S. Cl.
USPC .......................................................... 707/627
(58) Field of Classification Search .................. 707/627, 707/665
See application file for complete search history.

(56) References Cited

U.S. PATENT DOCUMENTS

| | | | |
|---|---|---|---|
| 6,516,423 B1 | 2/2003 | Stenlund et al. | 714/4 |
| 6,658,596 B1 | 12/2003 | Owen et al. | 714/16 |
| 7,415,632 B1 | 8/2008 | Beale et al. | 714/15 |
| 7,624,308 B2 | 11/2009 | Critchley et al. | 714/47 |
| 2003/0076849 A1* | 4/2003 | Morgan et al. | 370/412 |
| 2007/0234103 A1* | 10/2007 | Mall | 714/5 |
| 2008/0115128 A1 | 5/2008 | Achanta et al. | 718/100 |

FOREIGN PATENT DOCUMENTS

| | | |
|---|---|---|
| EP | 1303087 A2 | 4/2003 |
| WO | WO 2009/130848 A1 | 10/2009 |

OTHER PUBLICATIONS

Beardsmore, "Migrating Web Sphere MQ queue manager clusters from Web Sphere MQ V6 to V7," http://www.ibm.com/developerworks/websphere/library/techarticles/0910_beardsmore/0910_beardsmore.html, IBM Corporation, Oct. 2009.

* cited by examiner

*Primary Examiner* — Truong Vo
(74) *Attorney, Agent, or Firm* — VanLeeuwen & VanLeeuwen; Matthew W. Baca (57) ABSTRACT

An approach is provided where a put request is received to put a data entry into a queue. A detection is made that a primary queue data structure corresponding to the queue is damaged. If an alternate queue data structure corresponding to the queue has not yet been created, then the alternate queue data structure is dynamically created. The data entry is then stored in the alternate queue data structure.

20 Claims, 5 Drawing Sheets

CIRCUMVENTING QUEUE DOWNTIME IN A QUEUE DAMAGE SCENARIO

TECHNICAL FIELD

The present invention relates to circumventing queue downtime when a queue is damaged. More particularly, the present invention relates to creation and management of dynamic alternate queues when a primary queue is damaged.

BACKGROUND OF THE INVENTION

A queue is a data structure used to store messages in a message queuing environment. Each queue is owned by a queue manager. The queue manager is responsible for maintaining the queue it owns, and for storing all the messages it receives onto the appropriate queues. The messages might be put on the queue by application programs or by a queue manager as part of its normal operation. Putting a message to a queue can fail for various reasons such as queue full, put inhibit, authority error, queue damage, etc. Most of these errors are a part of queue's normal behavior. However, queue damage is an unexpected event which could result in potential queue downtime resulting in business outage. As used herein, a queue is "damaged" when it is not accessible due to corruption of the data structure.

SUMMARY

An approach is provided where a put request is received to put a data entry into a queue. A detection is made that a primary queue data structure corresponding to the queue is damaged. If an alternate queue data structure corresponding to the queue has not yet been created, then the alternate queue data structure is dynamically created. The data entry is then stored in the alternate queue data structure.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
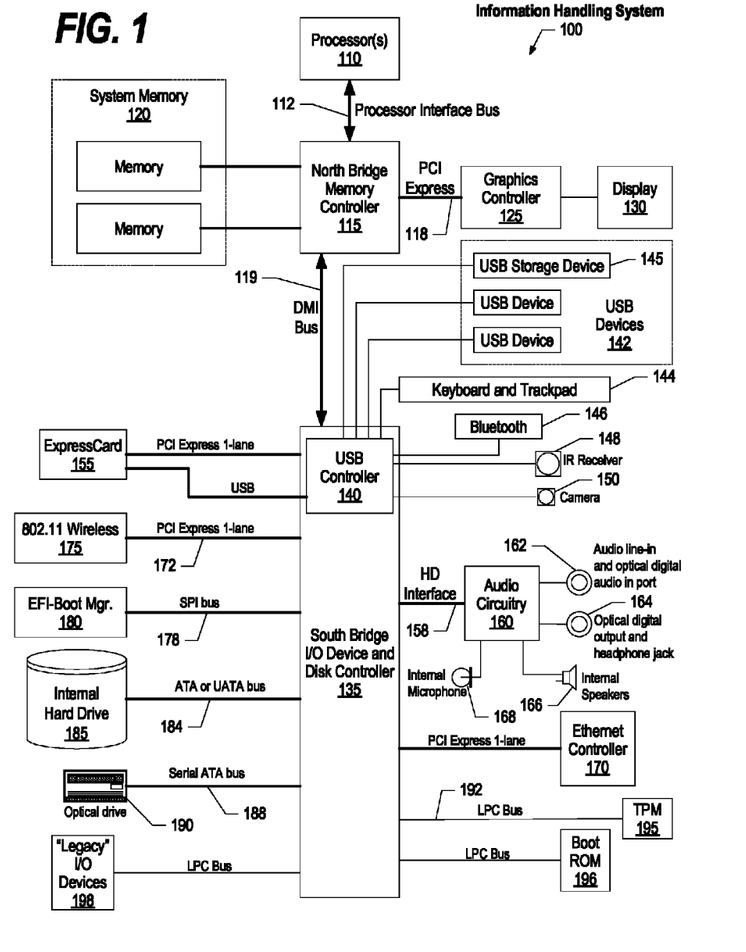
FIG. 1 is a block diagram of a data processing system in which the methods described herein can be implemented.
Figure 2:
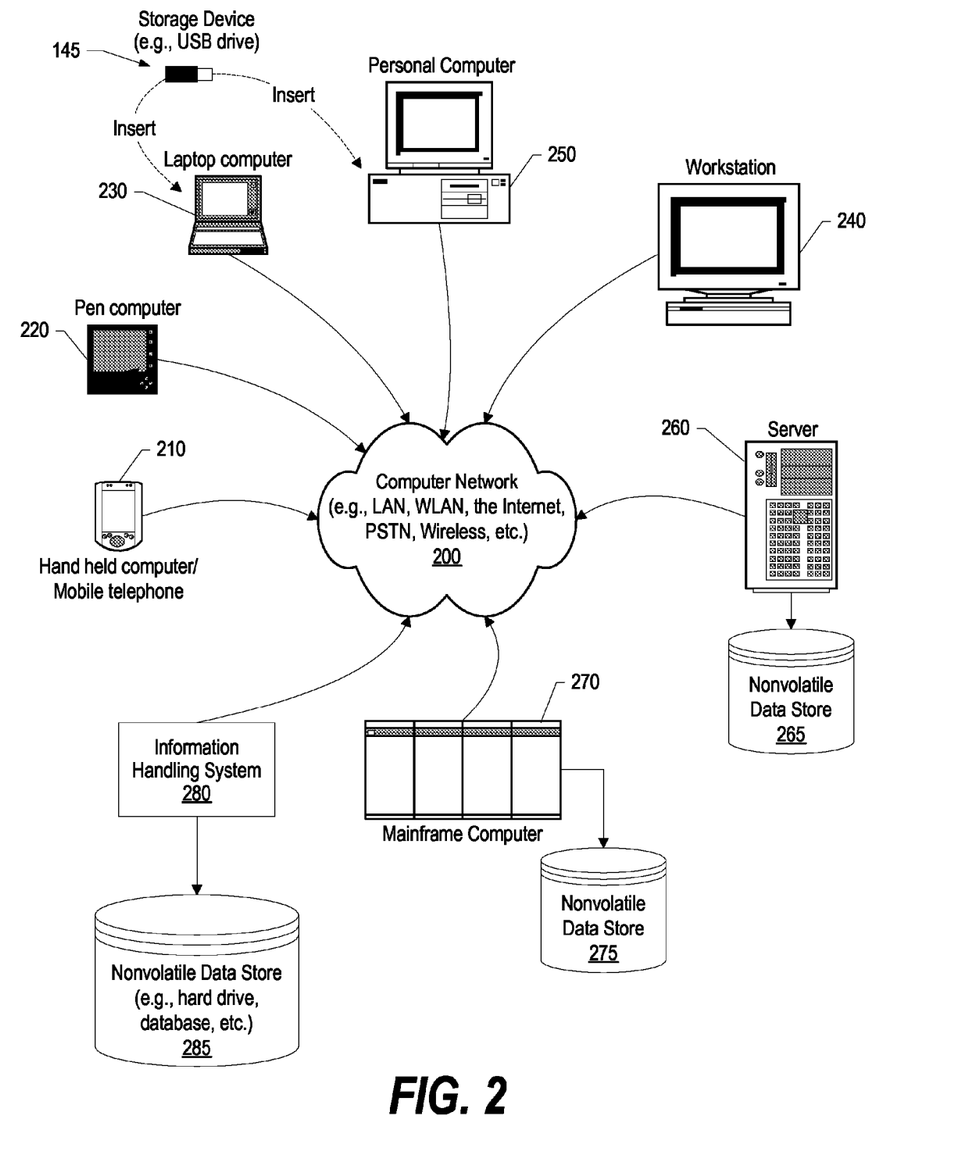
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
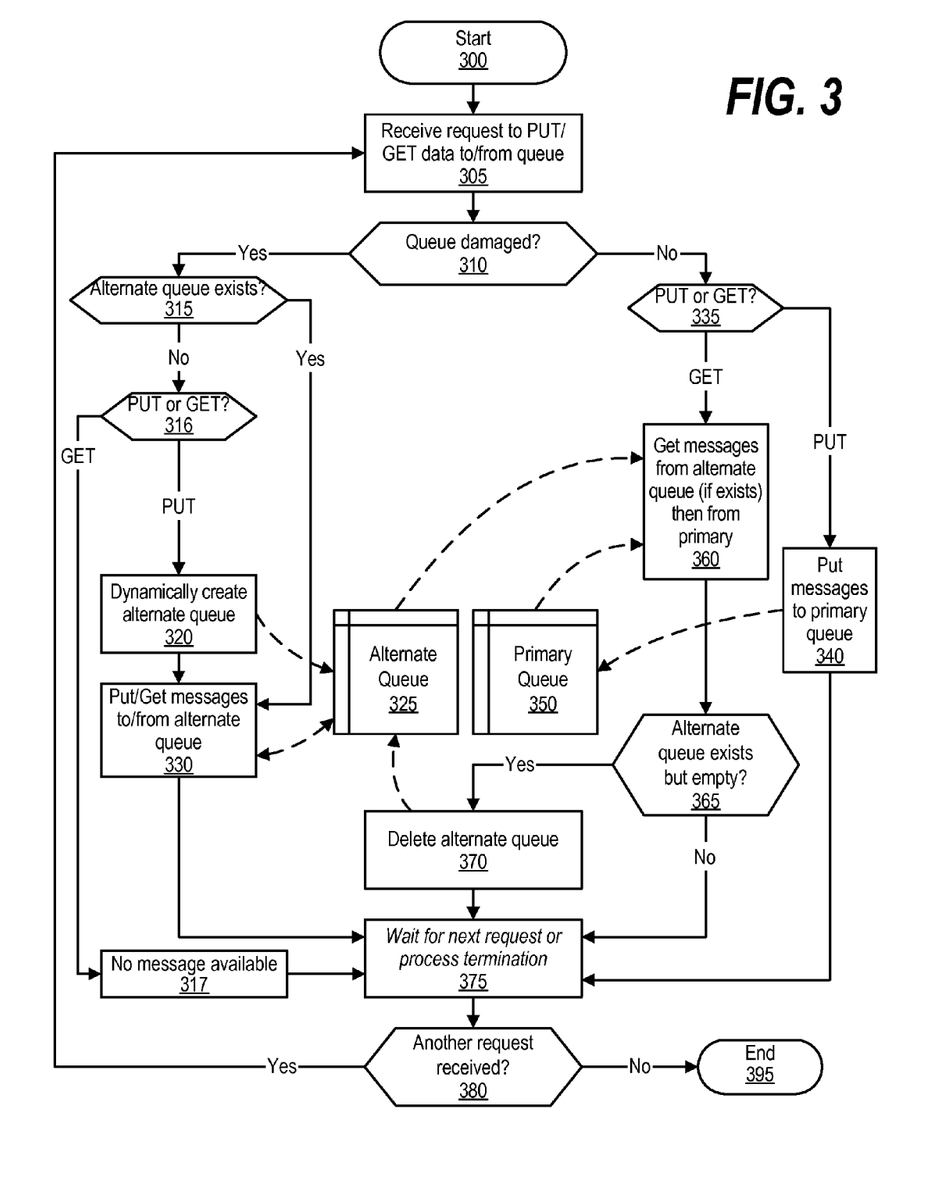
FIG. 3 is a flowchart showing overall processing of the approach that circumvents queue downtime.

FIG. 3 is a flowchart showing overall processing of the approach that circumvents queue downtime. Processing commences at 300 whereupon, at step 305, a request is received to either PUT or GET data to or from a queue. A decision is made as to whether a primary queue data structure corresponding to the queue is damaged (decision 310). As used herein, a queue data structure is "damaged" when it is not accessible due to corruption of the data structure. If the primary queue data structure is damaged, then decision 310 branches to the "yes" branch whereupon a decision is made as to whether an alternate queue data structure corresponding to the queue already exists (decision 315). If an alternate queue data structure does not yet exist (is nonexistent), then decision 315 branches to the "no" branch whereupon, a determination is made as to whether the request is to PUT data to the queue or GET data from the queue (decision 316). If the request is to PUT data to the queue, then decision 316 branches to "PUT" branch whereupon, at step 320, alternate queue data structure 325 is dynamically created and, at step 330, the data entry (e.g., a message, etc.) is stored (PUT) to alternate queue data structure 325. Returning to decision 315, if alternate queue data structure 325 already exists (e.g., a subsequent GET or PUT that is received after alternate queue data structure created), then decision 315 branches to the "yes" branch bypassing step 320 whereupon, at step 330, the data entry is either stored (PUT) into alternate queue data structure 325 or retrieved (GET) from the alternate queue data structure depending on the request. Returning to decision 316, if the alternate queue data structure does not exist and the request is a GET request, then decision 316 branches to the "GET"

branch whereupon, at step 317, a warning is returned to the requestor indicating that no messages are available in the queue.

Returning to decision 310, if the primary queue data structure is undamaged, then decision 310 branches to the "no" branch whereupon, a determination is made as to whether the request is a PUT or a GET request (decision 335). If the request is a PUT request, then decision 335 branches to the "PUT" branch whereupon, at step 340 a data entry (e.g., a message) is PUT to primary queue data structure 350. Returning to decision 335, if the request was a GET request, then decision 335 branches to the "GET" branch whereupon, at step 360, data entries (messages) are first retrieved from alternate queue data structure if the alternate queue data structure exists and then from the primary queue data structure if the alternate queue data structure does not exist. This situation would occur, for example, if the primary queue data structure was repaired sometime after alternate queue data structure was created. If the alternate queue data structure does not exist (is nonexistent), then step 360 handles GET requests by retrieving data entries (messages) from primary queue data structure 350. When a data entry is retrieved from a queue data store, the retrieval also includes removing the retrieved data entry from the queue data structure. A decision is made as to whether alternate queue data structure 325 currently exists but is now empty (decision 365), such as when step 360 retrieved the last data entry from alternate queue data structure 325. If alternate queue data structure exists but is now empty (has no more data entries), then decision 365 branches to the "yes" branch whereupon, at step 370, alternate queue data structure 325 is deleted. Of course, if primary queue data structure 350 becomes damaged again, the processing shown on the "yes" branch from decision 310 would once again be used to re-create the alternate queue data structure from which data entries (messages) would be stored (PUT) and retrieved (GET).

After the received request (PUT/GET) has been processed, at step 375, processing waits for the next PUT/GET request to be received or for the process to be terminated (e.g., a shutdown operation, etc.). A decision is made as to whether another request has been received (decision 380). If another decision is received, then decision 380 branches to the "yes" branch which loops back to handle the new request as described above. This looping continues until the process is terminated at which point decision 380 branches to the "no" branch and processing ends at 395.

Figure 4:
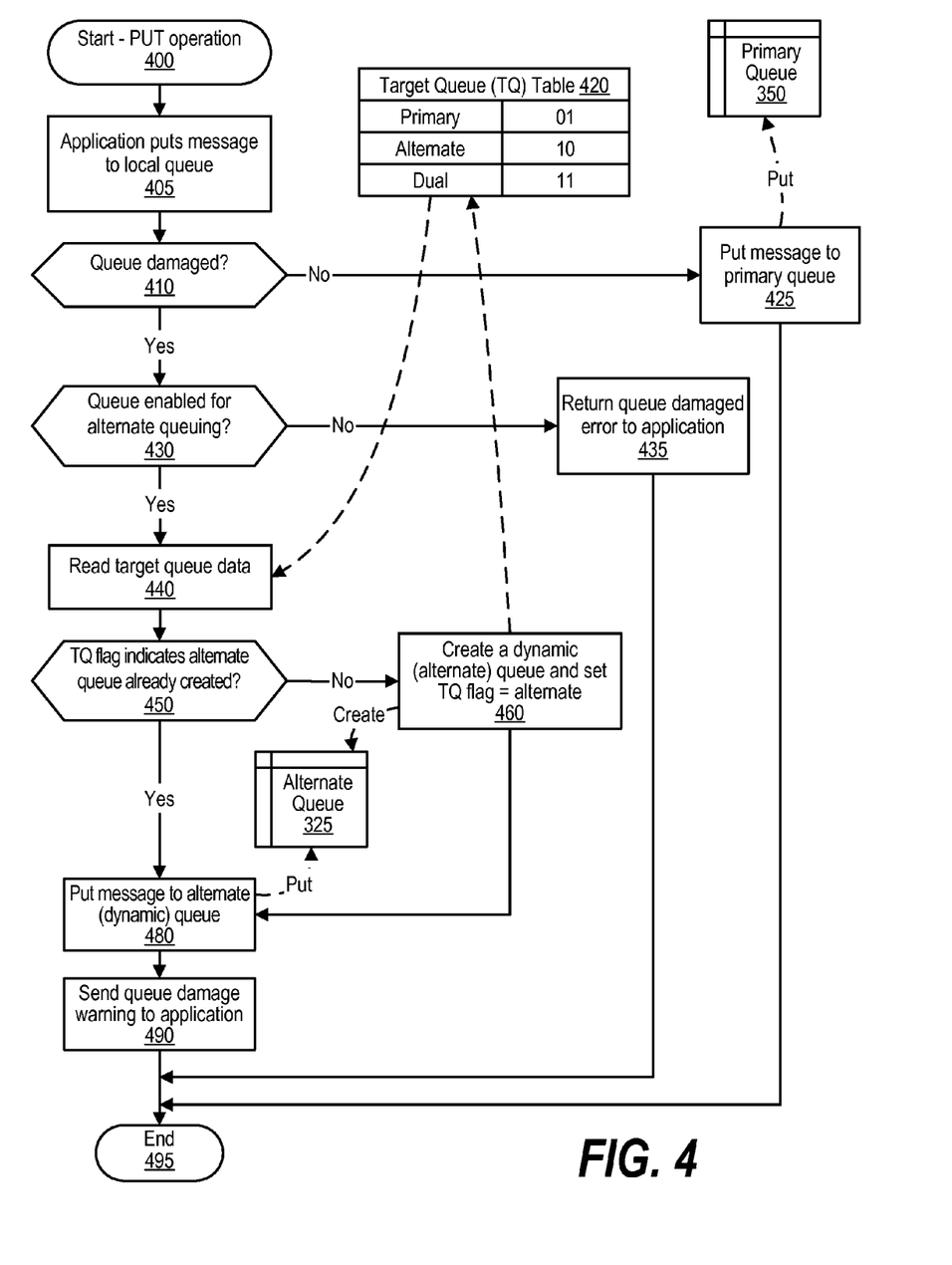
FIG. 4 is a flowchart showing steps performed during a PUT operation that stores data into a queue data structure using the approach that circumvents queue downtime.

FIG. 4 is a flowchart showing steps performed during a PUT operation that stores data into a queue data structure using the approach that circumvents queue downtime. PUT processing commences at 400 whereupon, at step 405 an application program PUTs a data entry (message) to a local queue (e.g., requests that a data entry (message) be written to a local queue, etc.).

A decision is made as to whether the primary queue data structure is damaged (decision 410), such as by checking the QS flag. If primary queue data structure 350 is undamaged, then decision 410 branches to the "no" branch whereupon, at step 425, the received data entry (message) is PUT (stored) in primary queue data structure 350. On the other hand, if primary queue data structure is damaged, then decision 410 branches to the "yes" branch whereupon a decision is made as to whether the queue has been enabled for alternate queuing (decision 430). If the queue has not been enabled for alternate queuing, then decision 430 branches to the "no" branch whereupon, at step 435, a warning is returned to the requestor (requesting application, etc.) indicating that the queue is damaged.

On the other hand, if the queue has been enabled for alternate queuing, then decision 430 branches to the "yes" branch whereupon at step 440 target queue (TQ) status is read from table 420. In one embodiment, target queue (TQ) status indicates one of three states: '01' indicates a "primary" state where only the primary queue data structure exists, '10' indicates an "alternative" state where the primary queue data structure is damaged and the alternate queue data structure is available for use, and '11' indicates a "dual" state where both the primary queue data structure and the alternate queue data structure are available for use. In this embodiment, when processing begins the TQ status indicator is initialized to '01' ("primary"). The status (damaged/undamaged) of the primary queue data structure is represented using a Boolean Queue Status (QS) flag. The QS flag is initialized to FALSE (undamaged) and is set to TRUE (damaged) when the primary queue data structure becomes damaged.

A decision is made as to whether alternate queue data structure 325 already exists (decision 450). In one embodiment, as discussed above, the TQ status indicator is set to either '10' ("alternate" state) or '11' ("dual" state) when alternate queue data structure exists and is set to '01' ("primary" state) when only the primary queue data structure exists. If alternate queue data structure 325 does not yet exist, then decision 450 branches to the "no" branch whereupon, at step 460, alternate queue data structure 325 is dynamically created and the TQ flag is set to '10' ("alternate" state). On the other hand, if alternate queue data structure already exists (as indicated by the TQ flag), then decision 450 branches to the "yes" branch bypassing step 460. At step 480, the received data entry (message) is stored (PUT) in alternate queue data structure 325. At step 490, a queue damage warning is sent to the application so that a system administrator, process, or other entity knows that the primary queue data structure is damaged and can commence repairing primary queue data structure 350. Processing of the PUT request thereafter ends at 495.

Figure 5:
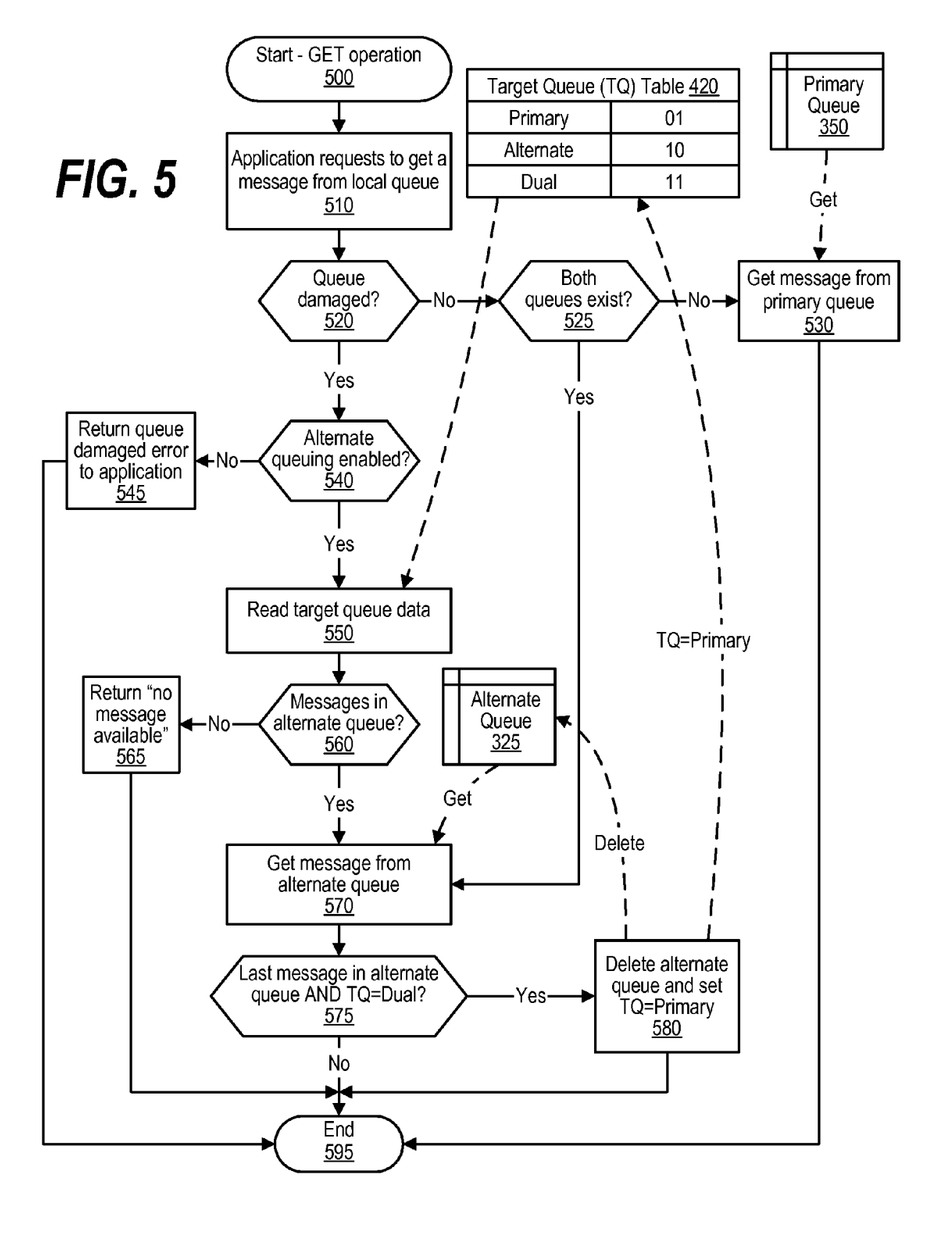
FIG. 5 is a flowchart showing steps performed during a GET operation that retrieves data from a queue data structure using the approach that circumvents queue downtime.

FIG. 5 is a flowchart showing steps performed during a GET operation that retrieves data from a queue data structure using the approach that circumvents queue downtime. GET processing commences at 500 whereupon, at step 510, an application requests to retrieve (GET) a data entry (message) from a local queue.

A decision is made as to whether primary queue data structure 350 is currently damaged (decision 525), such as by checking a Boolean Queue Status (QS) flag. If primary queue data structure is undamaged, then decision 525 branches to the "no" branch whereupon a decision is made as to whether both queues (primary queue data structure 350 and alternate queue data structure 325) currently exist (decision 525). If both queues do not exist (only primary queue data structure exists), then decision 525 branches to the "no" branch whereupon, at step 530, the data entry (message) is retrieved from primary queue data structure.

Returning to decision 520, if both queue data structures currently exist, then decision 520 branches to the "yes" branch whereupon the data entry (message) is retrieved from alternate queue data structure at step 570. When a data entry (message) is retrieved from a queue the data entry is also removed (deleted) from the queue. A decision is made as to whether the retrieved data entry (message) was the last entry in alternate queue data structure and whether both queues are in operation (decision 575), such as by the TQ flags indicating "dual" state. If alternate queue data structure is now empty and the state is "dual" (indicating that both primary queue data structure and alternate queue data structure are operational), then decision 575 branches to the "yes" branch whereupon, at step 580, alternate queue data structure 325 is deleted and the TQ flags are set to "primary" ('01') in memory area 420. On the other hand, if either alternate queue data structure is not empty (still contains one or more data entries) or the TQ flag is not set to "dual" (e.g., is set to "alternate", etc.), then decision 575 branches to the "no" branch bypassing step 580. Processing then ends at 595.

Returning to decision 520, if the primary queue data structure is damaged, then decision 520 branches to the "yes" branch whereupon a decision is made as to whether alternate queuing has been enabled for this queue (decision 540). If alternate queuing has not been enabled, then decision 540 branches to the "no" branch whereupon, at step 545, a warning is returned to the application indicating that the queue is damaged. Processing then ends at 595.

On the other hand, if alternate queuing is enabled, then decision 540 branches to the "yes" branch whereupon, at step 550, target queue flags are read from memory area 420. These flags indicate which queue data structures currently exist, as previously described. A decision is made as to whether there are any data entries (messages) in alternate data store 325 to retrieve (decision 560). If there are no entries to retrieve, then decision 560 branches to the "no" branch whereupon, at step 565, a warning is returned to the application program indicating that no messages are available for retrieval from the queue. On the other hand, if there are one or more data entries (messages) in alternate queue data structure 325, then decision 560 branches to the "yes" branch whereupon, at step 570, the next data entry (message) is retrieved (and removed) from alternate queue data structure 325. A decision is made as to whether the alternate queue data structure is now empty and if both queue data structures (primary 350 and alternate 325) are currently available (decision 575). Since, in this scenario, primary queue data structure 350 is damaged, both queues would not be available (instead, the TQ flags would indicate that primary queue data structure 350 is damaged and alternate queue data structure is available (TQ='10')). Therefore, decision 575 would branch to the "no" branch bypassing step 580 and processing of the GET request would end at 595.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method comprising:
   receiving a put request to put a data entry into a queue;
   detecting that a primary queue data structure corresponding to the queue is damaged;
   in response to detecting that the primary queue data structure is damaged, determining whether an alternate queue data structure has been created that corresponds to the queue, wherein the alternate queue data structure is different than the primary queue data structure;
   in response to the determination being that the alternate queue data structure is nonexistent:
      dynamically creating the alternate queue data structure; and
      storing the data entry in the dynamically created alternate queue data structure; and
   in response to the determination being that the alternate queue data structure already exists:
      storing the data entry in the alternate queue data structure.

2. The method of claim 1 further comprising:
   receiving a get request to get the data entry from the queue;
   detecting that the primary queue data structure corresponding to the queue is damaged; and
   retrieving the data entry from the alternate queue data structure in response to the detecting, wherein the retrieving includes removing the data entry from the alternate queue data structure.

3. The method of claim 1 further comprising:
   receiving a get request to get the data entry from the queue;
   detecting that the primary queue data structure corresponding to the queue is undamaged;
   detecting that the alternate queue data structure currently exists; and
   retrieving the data entry from the alternate queue data structure in response to the detection of the alternate queue data structure, wherein the retrieving includes removing the data entry from the alternate queue data structure.

4. The method of claim 3 further comprising:
   repairing the primary queue data structure prior to the detection that the primary queue data structure is undamaged.

5. The method of claim 3 further comprising:
   after the retrieval and removal of the data entry from the alternate queue data structure:
      deleting the alternate queue data structure in response to determining that the alternate queue data structure is void of data entries.

6. The method of claim 5 further comprising:
receiving a subsequent put request after the deletion of the alternate queue data structure, wherein the put request corresponds to a subsequent data entry;
detecting that the primary queue data structure is undamaged;
storing the subsequent data entry in the primary queue data structure in response to the detection that the primary queue data structure is undamaged.

7. The method of claim 5 further comprising:
receiving a subsequent get request after the deletion of the alternate queue data structure, wherein the get request corresponds to a subsequent data entry;
detecting that the primary queue data structure is undamaged;
retrieving the subsequent data entry from the primary queue data structure in response to the detection that the primary queue data structure is undamaged,
wherein the retrieval includes removing the data entry from the primary queue data structure.

8. An information handling system comprising:
one or more processors;
a memory coupled to at least one of the processors;
a set of instructions stored in the memory and executed by at least one of the processors in order to perform actions of:
receiving a put request to put a data entry into a queue;
detecting that a primary queue data structure corresponding to the queue is damaged;
in response to detecting that the primary queue data structure is damaged, determining whether an alternate queue data structure has been created that corresponds to the queue, wherein the alternate queue data structure is different than the primary queue data structure;
in response to the determination being that the alternate queue data structure is nonexistent:
dynamically creating the alternate queue data structure; and
storing the data entry in the dynamically created alternate queue data structure; and
in response to the determination being that the alternate queue data structure already exists:
storing the data entry in the alternate queue data structure.

9. The information handling system of claim 8 wherein the processors perform further actions comprising:
receiving a get request to get the data entry from the queue;
detecting that the primary queue data structure corresponding to the queue is damaged; and
retrieving the data entry from the alternate queue data structure in response to the detecting, wherein the retrieving includes removing the data entry from the alternate queue data structure.

10. The information handling system of claim 8 wherein the processors perform further actions comprising:
receiving a get request to get the data entry from the queue;
detecting that the primary queue data structure corresponding to the queue is undamaged;
detecting that the alternate queue data structure currently exists; and
retrieving the data entry from the alternate queue data structure in response to the detection of the alternate queue data structure, wherein the retrieving includes removing the data entry from the alternate queue data structure.

11. The information handling system of claim 10 wherein the processors perform further actions comprising:
repairing the primary queue data structure prior to the detection that the primary queue data structure is undamaged.

12. The information handling system of claim 10 wherein the processors perform further actions comprising:
after the retrieval and removal of the data entry from the alternate queue data structure:
deleting the alternate queue data structure in response to determining that the alternate queue data structure is void of data entries.

13. The information handling system of claim 12 wherein the processors perform further actions comprising:
receiving a subsequent put request after the deletion of the alternate queue data structure, wherein the put request corresponds to a subsequent data entry;
detecting that the primary queue data structure is undamaged;
storing the subsequent data entry in the primary queue data structure in response to the detection that the primary queue data structure is undamaged.

14. A computer program product stored in a computer readable storage device, comprising functional descriptive material that, when executed by an information handling system, causes the information handling system to perform actions that include:
receiving a put request to put a data entry into a queue;
detecting that a primary queue data structure corresponding to the queue is damaged;
in response to detecting that the primary queue data structure is damaged, determining whether an alternate queue data structure has been created that corresponds to the queue, wherein the alternate queue data structure is different than the primary queue data structure;
in response to the determination being that the alternate queue data structure is nonexistent:
dynamically creating the alternate queue data structure; and
storing the data entry in the dynamically created alternate queue data structure; and
in response to the determination being that the alternate queue data structure already exists:
storing the data entry in the alternate queue data structure.

15. The computer program product of claim 14 wherein the actions further comprise:
receiving a get request to get the data entry from the queue;
detecting that the primary queue data structure corresponding to the queue is damaged; and
retrieving the data entry from the alternate queue data structure in response to the detecting, wherein the retrieving includes removing the data entry from the alternate queue data structure.

16. The computer program product of claim 14 wherein the actions further comprise:
receiving a get request to get the data entry from the queue;
detecting that the primary queue data structure corresponding to the queue is undamaged;
detecting that the alternate queue data structure currently exists; and
retrieving the data entry from the alternate queue data structure in response to the detection of the alternate queue data structure, wherein the retrieving includes removing the data entry from the alternate queue data structure.

17. The computer program product of claim 16 wherein the actions further comprise:

repairing the primary queue data structure prior to the detection that the primary queue data structure is undamaged.

18. The computer program product of claim 16 wherein the actions further comprise:

after the retrieval and removal of the data entry from the alternate queue data structure:

deleting the alternate queue data structure in response to determining that the alternate queue data structure is void of data entries.

19. The computer program product of claim 18 wherein the actions further comprise:

receiving a subsequent put request after the deletion of the alternate queue data structure, wherein the put request corresponds to a subsequent data entry;

detecting that the primary queue data structure is undamaged;

storing the subsequent data entry in the primary queue data structure in response to the detection that the primary queue data structure is undamaged.

20. The computer program product of claim 18 wherein the actions further comprise:

receiving a subsequent get request after the deletion of the alternate queue data structure, wherein the get request corresponds to a subsequent data entry;

detecting that the primary queue data structure is undamaged;

retrieving the subsequent data entry from the primary queue data structure in response to the detection that the primary queue data structure is undamaged, wherein the retrieval includes removing the data entry from the primary queue data structure.

* * * * *